(12) United States Patent
Page et al.

(10) Patent No.: US 7,104,531 B2
(45) Date of Patent: Sep. 12, 2006

(54) APPARATUS FOR THE PREPARATION OF LIQUIDS FOR THE DISPENSE OF BEVERAGES

(76) Inventors: John K. R. Page, 16 Oaktree Way, Little Sandhurst, Camberley GU 47 8QS (GB); Mark George Page, 12 Dovedale Close, Owlsmoor, Camberley GU47 0YG (GB)

( * ) Notice: Subject to any disclaimer, the term of this patent is extended or adjusted under 35 U.S.C. 154(b) by 0 days.

(21) Appl. No.: 11/343,679

(22) Filed: Jan. 31, 2006

(65) Prior Publication Data

US 2006/0125128 A1    Jun. 15, 2006

Related U.S. Application Data

(63) Continuation-in-part of application No. 10/852,900, filed on May 25, 2004.

(30) Foreign Application Priority Data

May 30, 2003  (GB) .................................. 031242.1
Nov. 12, 2003  (GB) ................................ 0326296.1

(51) Int. Cl.
*B01F 3/04* (2006.01)
(52) U.S. Cl. ................. 261/104; 261/DIG. 7; 99/323.1
(58) Field of Classification Search ............... 261/104, 261/121.1, 122.1, 122.2, DIG. 7; 99/323.1, 99/323.2; 426/474, 477
See application file for complete search history.

(56) References Cited

U.S. PATENT DOCUMENTS

| 4,636,307 A | * | 1/1987 | Inoue et al. ................. 210/188 |
| 4,927,567 A | | 5/1990 | Rudick |
| 4,950,431 A | | 8/1990 | Rudick et al. |
| 5,565,149 A | | 10/1996 | Page et al. |
| 5,738,808 A | | 4/1998 | Iwamoto |
| 6,138,995 A | | 10/2000 | Page |
| 6,158,721 A | | 12/2000 | Katou et al. |
| 6,164,632 A | | 12/2000 | Uchida et al. |
| 6,659,433 B1 | | 12/2003 | Kusano et al. |
| 6,663,745 B1 | * | 12/2003 | Cheng et al. ................ 156/293 |
| 6,712,342 B1 | | 3/2004 | Bosko |

FOREIGN PATENT DOCUMENTS

| DE | 20215317 | 4/2003 |
| EP | 1491491 | 12/2004 |
| GB | 2190853 | 12/1987 |

* cited by examiner

*Primary Examiner*—Scott Bushey
(74) *Attorney, Agent, or Firm*—Polster, Lieder, Woodruff & Lucchesi, L.C.

(57) ABSTRACT

The present invention provides an apparatus for dissolving a gas in a liquid, the apparatus comprising (a) a closed vessel containing a liquid at a predetermined level, (b) a contactor module at least partially immersed in the liquid having (1) a gas supply channel to the bore side of the fibers, (2) a liquid supply channel to the shell side of the fibers, and (3) an exit port for transport of a gas-containing liquid, and (c) the remaining space in the closed vessel being occupied by a pressurized gas. The liquid prepared in the apparatus of the present invention containing a dissolved gas, is used to prepare beverages, such as coffee, tea, soda, chocolate and the like, whether hot or cold.

9 Claims, 2 Drawing Sheets

APPARATUS FOR THE PREPARATION OF LIQUIDS FOR THE DISPENSE OF BEVERAGES

CROSS-REFERENCE TO RELATED APPLICATIONS

This application is a continuation-in-part of U.S. Ser. No. 10/852,900 filed May 25, 2004.

This application claims the priority of United Kingdom Application 0312421.1 filed 30 May 2003 and United Kingdom Application 0326296.1 filed 12 Nov. 2003 under 35 U.S.C. § 119.

STATEMENT REGARDING FEDERALLY SPONSORED RESEARCH

Not Applicable.

BACKGROUND OF THE INVENTION

Many beverages require certain levels of gases to be dissolved in at least one of the constituent liquids prior to dispense in order to achieve the desired taste and or presentation effects in the final beverage. Examples of such beverages include carbonated juices, sodas, and the like where carbon dioxide is either pre-dissolved at elevated pressure in water which is added to a concentrate or is pre-dissolved at elevated pressure in the mixture of water plus concentrate. When dispensed correctly a substantial portion of the carbon dioxide remains in solution in the glass or cup, producing the familiar taste effect when the beverage is consumed. Other examples of beverages include chilled or hot coffees, and chocolates where either nitrogen or air gases are pre-dissolved at elevated pressure in water or in pre-mixed water with concentrate. When these liquids are dispensed correctly, the pre-dissolved gases are substantially removed from solutions on passage of the liquid thru the dispense tap to form a large quantity of small bubbles which float and settle at the top of the beverage to produce an appealing presentation of the drink in the glass or cup.

Still further examples include beverages based on dairy products, which contain pre-dissolved nitrous oxide and water-based beverages containing pre dissolved oxygen.

The use of gas/liquid contactor modules containing non-flooding gas-permeable hollow fibers and associated control schemes for controlling dissolved gases in liquids have been described in U.S. Pat. No. 5,565,149 (herein incorporated by reference). Technology disclosed in U.S. Pat. No. 5,565,149 has been commercialized in a range of Cellarstream® dispense systems which are manufactured and marketed by Headmaster, Ltd., Bramshill, United Kingdom and Permea a division of Air Products and Chemicals, Inc. Allentown, Pa., U.S.A.

The amount of a gas which can be dissolved in a liquid at a selected temperature, is proportional to the applied absolute pressure of the gas.

Hitherto, beverage dispense systems utilizing the gas/liquid contactors have consisted of the two shell ports of the contactor module being connected respectively to a pressurized liquid source and to a dispense tap, whereas the contactor module gas port is connected to a pressurized gas source.

In order to maintain efficient operation of such systems, additional controls such as those described in U.S. Pat. No. 5,565,149 are necessary to maintain the pressure of gas applied to the contactor fibers at substantially the same pressure as that of the liquid supply in the contactor module. These conventional systems have drawbacks for certain applications.

Where it is desired to dissolve a large amount of a weakly soluble gas, e.g., nitrogen, for a beverage such as a chilled draft coffee beverage, the contactor module must be built to operate safely at correspondingly high pressures on both the liquid and gas sides of the system. At a working temperature of 3° C. contactor modules rated for operation at a maximum pressure of 4 bar gauge will deliver a maximum level of dissolved nitrogen of approximately 110 ml per liter of water. This pre-dissolved gas level directly determines the size of "head" on the dispensed drink, and it is generally accepted that operation of contactor modules at high pressure to deliver high levels of dissolved gas will be desirable if that could be achieved economically.

Additional drawbacks of relatively high costs and complexity of installations present barriers to wide exploitation of such contactor module systems where compared to some retail outlets, a lower frequency of usage would be the norm, for example, in the domestic market sector.

The present invention provides a novel apparatus for utilizing hollow fiber gas/liquid contactor modules at much higher liquid and gas pressures than has hitherto been practical or economical. The apparatus of the present invention is thus able to deliver liquids containing significantly higher concentrations of dissolved gas than is possible with a conventional apparatus. A further advantage of the apparatus of the present invention arises from the elimination of the need for controls to balance liquid and gas pressures within the contactor module thus reducing both the costs and the complexity of most installations. A still further advantage arising from the present invention is that when the apparatus is used to dissolve a highly-soluble gas, such as carbon dioxide, the practical performance of the contactor module in typical dispense operation is significantly greater than that of the contactor module of comparable geometry operated in the conventional manner.

The present invention relates to an apparatus and a method for utilizing the apparatus for applying gas/liquid contactor modules containing hollow fibers for dissolving gases in liquids prior to dispense of a liquid as a beverage.

SUMMARY OF THE INVENTION

The present invention provides an apparatus for preparation and dispense of a gas-saturated liquid beverage. In the following description, the term batch refers to the volume of liquid provided within the vessel and does not refer to the smaller volume of liquid which is withdrawn in a given dispense operation. The vessel contains a hollow fibre contactor module which is held vertically within the closed vessel so that the module is at least partially immersed in the liquid. The vessel further provides for addition of a batch of feed liquid to the vessel, such additions are made only between dispensing operations and only up to a predetermined level within the vessel. Within the vessel, the remaining space is occupied by gas which may be pressurized. The vessel has one port for passage of liquid, arranged so that (a) the liquid being dispensed exits the vessel after entering the lower end of the contactor module and passing upwards through the contactor module, and (b) the feed liquid being added to the vessel enters the container after passing downwards through the contactor module. Further, the vessel has one port for passage of a gas, arranged so that (a) when the container is not being re-filled with liquid, the gas is applied at a selected pressure to both the bore side of the fibres within the contactor module and to the surface of liquid contacting the exterior of the contactor module, and (b) when the vessel is being re-filled with another batch of liquid this port provides for exit of gas from the vessel which gas is displaced by the incoming liquid.

The liquid within the vessel may be a beverage such as coffee, tea, soda, and the like or a concentrate suitable for making a beverage by the addition of another liquid, or water.

The pressurized gas within the vessel is typically a gas such as carbon dioxide, nitrogen, nitrous oxide, oxygen, air and the like to be dissolved in liquid for a beverage.

Typically the contactor module contains a bundle of hollow fibre membranes, which fibres are gas permeable and liquid impermeable. The fibres are open at their uppermost end and closed at their lowermost end. The contactor module has an uppermost gas supply channel in communication only with the bore side of the fibres. There are two ports communicating with the shell side of the module, which is the volume outside the hollow fibres but within the module. The shell side is always flooded with the liquid. There is a lower port which is kept submerged in the liquid and which is open to the surrounding container, and an upper port which is arranged to register with the single port provided on the vessel both for exit of dispensed liquid and for entry of feed liquid during re-filling.

When the vessel contains some liquid and gas is applied at an elevated pressure, the contactor provides for the gas to dissolve efficiently in the liquid which is held within, and which passes upwards through the shell side of the contactor module.

When the vessel is re-filled with a subsequent batch of feed liquid, the pressure of gas within the vessel must be controlled by conventional means hot described here, to enable gas to be displaced and to exit through the single gas port provided. Therefore the vessel may be re-filled even when the feed liquid is available at only atmospheric pressure. Alternatively, if the supply pressure of the feed liquid is relatively high, the gas pressure within the vessel can be controlled to a level which is below that of the liquid supply but is still sufficiently high to achieve substantial solution of gas into the liquid as it flows downwards through the contactor module before entering the surrounding vessel. In addition to reducing wastage of gas, this apparatus is advantageous in applications requiring high dispense flow rates because the contactor module is processing liquid from the vessel which has already been partially processed before entering the contactor module's lower liquid port.

DESCRIPTION OF THE DRAWINGS

In the accompanying drawings which form part of the specification.

Corresponding reference numerals indicate corresponding parts throughout the several figures of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
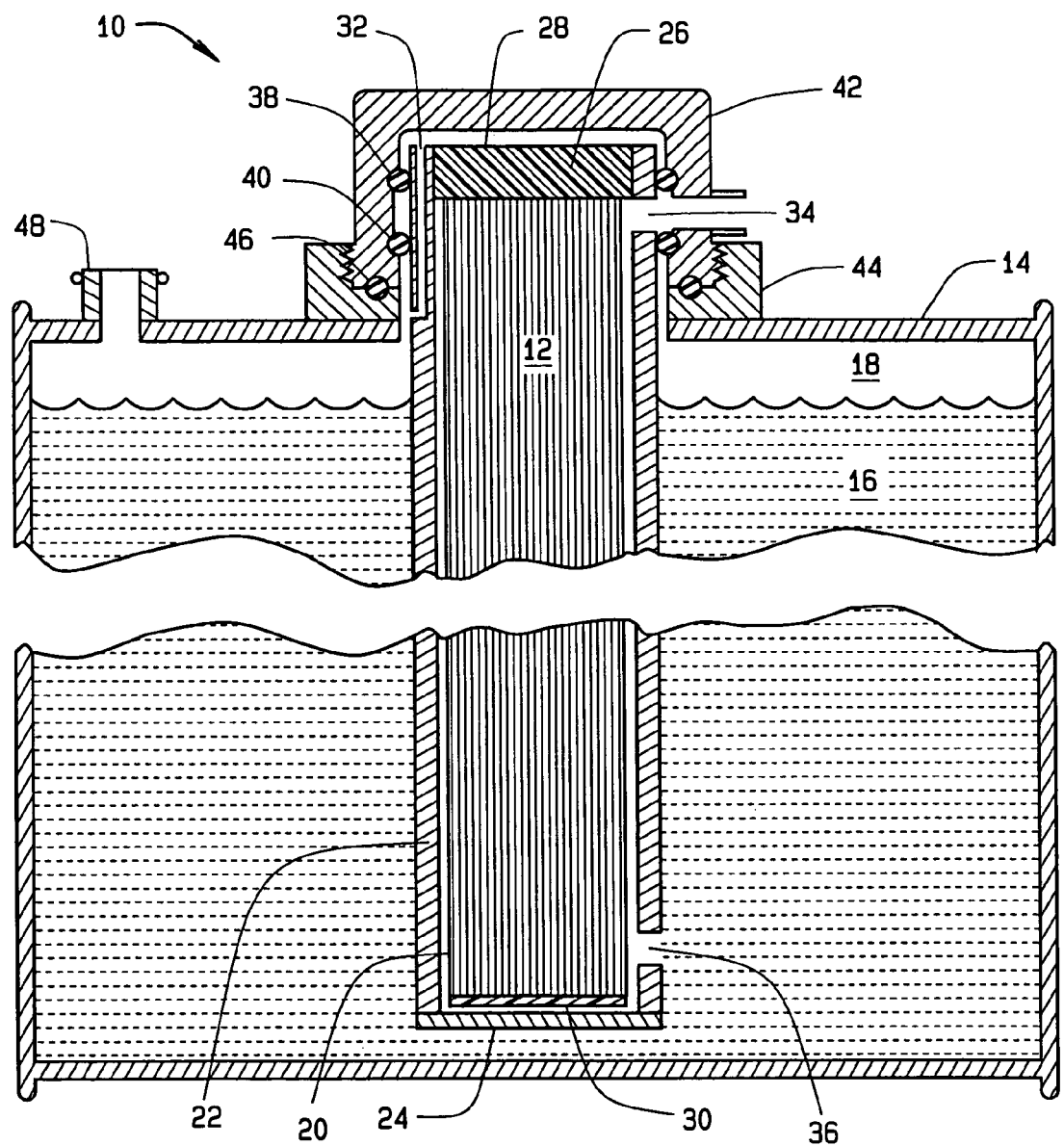
FIG. 1 depicts a cross-sectional view of one embodiment of the present invention.

FIG. 1 depicts a cross-sectional view of one embodiment of the present invention. An apparatus 10 having a closed vessel 14 is provided which contains a liquid 16 and a contactor module 24. The module 24 has a shell 22 surrounding a bundle of hollow fibers 12. The module 24 has a space 20 surrounding the bundle of hollow fibers 12 wherein a liquid resides. The contactor module 24 has an end cap 30 in the lower area which seals the ends of the fibers in the fiber bundle 12 thereby preventing entry of liquid to the interior of the fibers. There is an upper seal 26 which seals the regions around the fibers, however, the upper surface of the seal 26 provides a fiber face 28 which is open to the atmosphere allowing the interior of the fibers 12 to receive gas.

The upper portion of the closed vessel 14 is provided with a cap 42 which covers the open face of the hollow fibers 28 and provides a gas channel 32, which supplies pressurized gas to the open face 28 of the bundle of fibers 12. The cap 42 is sealed between the contactor shell 22 and the inside of the cap 42 with ring seals 38 and 40. An outlet port 34 is provided to allow liquid, surrounding the fiber bundle 12 in the space 20, to exit from the contactor module 24. The interior of the closed vessel 14 has a predetermined level of a liquid 16 and in the remaining portion of the interior of the closed container 14 there is a pressurized gas 18 which remains under pressure.

In the apparatus 10, the contactor module 24 is provided with a lower port 36 to receive liquid from the liquid 16 in the closed vessel 14. The liquid 16 enters the contactor at the port 36 and fills the space 20 between the fiber bundle 12 and the contactor exterior shell 22. In the use of the apparatus 10, when a gas-containing liquid is desired, the gas-containing liquid is removed through an upper port 34. The cap 42 is provided with an additional ring seal 44 and a pressure seal 46, to prevent the pressurized gas from escaping from the closed container 14. A port 48 is connected to a pressurized gas and hence allows gas to enter the closed vessel 14 at the port 48 to provide the necessary pressurized gas in the space 18 in the apparatus 10.

Figure 2:
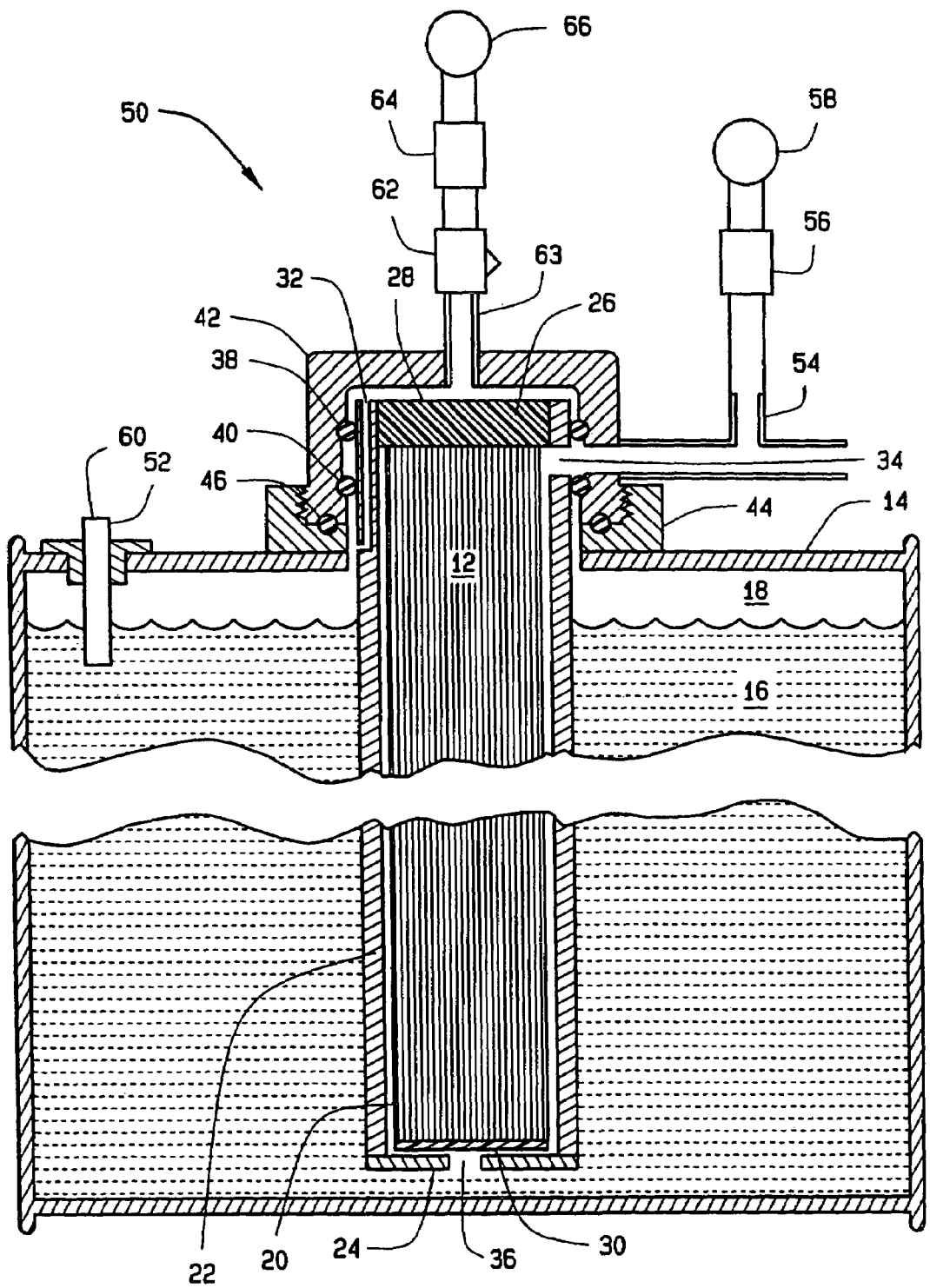
FIG. 2 depicts a cross-sectional view of another embodiment of the present invention.

FIG. 2 depicts a cross-sectional view of a further embodiment of the present invention. An apparatus 50 has a gas inlet port 63 which is machined within the cap 42 and provides pressurized gas to the gas channel 32. A 3-port, 2-position valve 62 is optionally included in the gas feed line upstream of the gas port 63. A gas pressure regulator 64 is placed between the valve 62 and the gas source 66. The gas source 66 provides pressurized gas at a predetermined pressure to fill the space 18. In the present embodiment, the level of the liquid 16 can be maintained automatically between two selected levels, an upper level and a lower level. When sufficient dispense of the gas-containing liquid through the port 34 causes the liquid level to fall below the lower selected level, a controller 60 operates a valve 62, to vent pressurized gas from the closed vessel 14. The controller 60 also operates a valve 56 which allows liquid from the liquid source 58 to be added through a port 54 until the higher selected liquid level is reached in the closed vessel 14. The controller 60 then operates the valve 62 and closes the liquid entry valve 56 to allow gas pressure to be reapplied to the space 18 in the closed vessel 14.

The closed vessel 14 is further provided with a controller 60 containing a sensor means 52, which sensor means 52 detects when the liquid level falls below the lower preselected level and when the liquid level reaches the upper preselected liquid level. Thus the controller 60 signals the liquid controlling valve 56 to open and close respectively when the liquid 16 reaches the lower level and again upon refilling when the liquid reaches the upper preselected level.

An additional advantage of this embodiment of the invention is that the water level can be maintained automatically between the preselected upper and lower levels without needing to depressurize the closed vessel 14, before commencing each refilling operation. If the pressure of the water source 58 is above the operating pressure of the closed vessel 14, the valve 62 may be omitted in this mode of operation.

This embodiment of the invention has the further advantage that there is no waste of pressurized gas involved in the operation. This is because all of the water added to the closed vessel 14 during each refilling operation must first past through the contactor module 24. This provides a high efficiency in the dissolving of the pressurized gas into the liquid because all of the liquid leaving the system has passed twice through the contactor module 24. As will be shown in subsequent examples, it has been found that the efficiency for the dissolving of gas into a liquid is significantly higher than the efficiency of a single comparable contactor module operated in a conventional manner at the same pressure, temperature, and dispense flow rate.

EXAMPLE 1

A contactor module was assembled within a 10 liter keg according to the embodiment shown in FIG. 3. The keg was filled with water at 12° C., sealed, and pressurized with nitrogen at 4 bar gauge pressure.

The keg outlet was connected to a dispense tap fitted with a "creamer disc" with 5 holes each of 0.5 mm diameter.

185 ml of liquid was dispensed via the tap into a parallel-sided glass containing 15 ml of liquid coffee concentrate.

The liquid level in the glass was 100 mm for 200 ml liquid content.

After settling, a thick foam (of about 10 mm in thickness) made of tight and stable small bubbles had formed on the beverage. Allowing for the normal liquid content in the foam, this head corresponds to a dissolved nitrogen level of approximately 90 ml of nitrogen per liter of liquid.

EXAMPLE 2

Using the same arrangement as in Example 1, the keg was pressurized with nitrogen at 7 bar gauge at the same temperature.

185 ml was dispensed from the same tap into the same parallel-sided glass containing 15 ml of liquid coffee concentrate.

After settling, 17 mm of thick foam made of tight and stable small bubbles had formed on the beverage. Allowing for the normal liquid content in the foam, this head corresponds to a dissolved nitrogen level of approximately 145 ml of nitrogen per liter of liquid.

EXAMPLE 3

A contactor module, 51 mm internal diameter and containing an active fiber area of 1.2 square meters, was fitted to a 10.5 liter keg according to the embodiment shown in FIG. 2. The keg was insulated and fitted with a liquid level sensor, a liquid level controller and a solenoid valve in line from a source of vacuum-degassed water according to the arrangement shown in FIG. 2.

The level sensor was a type which only detected a single level, set at 9.5 liters. The controller was provided with a switch which simulated the action of a low-level detection and thus allowed the user to determine when to start refilling the keg. The space in the keg was initially filled with carbon dioxide gas supplied from a cylinder via a non-relieving pressure regulator set at a delivery pressure of 3 bar. A pressure gauge was fitted in the feed gas line downstream of this regulator.

The water source was at a pressure of 4.2 bar and at a temperature of 13.3° C. The keg started filling with water when electrical power was applied to the controller, and continued filling until the upper level set by the level sensor was reached. During this time the reading on the pressure gauge in the feed gas line remained at 3 bar.

The carbonation levels of a sequence of five dispensed volumes of 200 ml each dispensed at a flow rate of 2.0 liters per minute, were measured with a carbonation analyzer of a type used for testing sodas. The measured carbonation levels remained constant at 4.22 volumes of carbon dioxide per volume of liquid for all samples.

The controller switch was operated and the keg re-filled again. The feed gas pressure gauge remained at 3 bar, and a further sequence of five 200 ml volumes were dispensed at a flow rate of 1 liter per minute. The measured carbonation levels remained constant at 4.22 volumes of carbon dioxide per volume of liquid.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A refillable apparatus for dissolving a gas in a liquid and for dispensing the gas-containing liquid, the apparatus comprising a pressurizable vessel having a single external duct for passage of liquid into and out of the vessel and a single external duct for passage of a gas into and out of the vessel, the vessel containing:

(1) a liquid whose level is allowed to vary between two predetermined levels within the vessel;

(2) a contactor module held vertically and always at least partially immersed in the liquid, comprising hydrophobic gas permeable hollow fibers having bore volumes within a shell, the fibers extending from their lower end where they are closed, and passing through an uppermost seal in the shell which is constructed to separate the volume of the shell below the seal, where only the outer surfaces of the fibers are in contact with the liquid over their length below the seal, from the upper volume of the shell where the gas entering the gas duct of the vessel communicates at all times with the bore volumes of the fibers and the surface of the liquid contacting the exterior of the module, the module having:

(a) a channel at its immersed lower end, where the fiber ends are sealed, allowing communication of the liquid within the module with the liquid in the vessel contacting the module; and (b) a channel at its upper end positioned below the fiber seal to allow communication of the liquid within the module with the single external duct for the liquid; and (3) any remaining space in the vessel being occupied by the gas under pressure.

2. The apparatus of claim 1 wherein the apparatus is provided with a means for connection to an external source of pressurized gas.

3. The apparatus of claim 1 wherein the apparatus is provided with a means for connection to an external source of liquid.

4. The apparatus of claim 3 wherein the liquid is under pressure.

5. The apparatus of claim 1 wherein the apparatus is provided with a means to detect and control the level of liquid in the closed container.

6. The apparatus of claim 1 wherein the apparatus is provided with a means to release the gas pressure within the closed container prior to refilling the closed container with a predetermined quantity of liquid.

7. The apparatus of claim 1 wherein the contactor module is completely immersed in the liquid.

8. The apparatus of claim 1 wherein the liquid is water, coffee, tea, chocolate, soda or a liquid concentrate thereof.

9. The apparatus of claim 1 wherein the pressurized gas is nitrogen, oxygen, air, nitrous oxide, carbon dioxide or a mixture thereof.

* * * * *